United States Patent [19]
Swinson

[11] Patent Number: 5,347,203
[45] Date of Patent: Sep. 13, 1994

[54] CONTROL SYSTEM, ESPECIALLY FOR FILM AND VIDEO TAPE TRANSPORT

[75] Inventor: Peter R. Swinson, St Albans, United Kingdom

[73] Assignee: Rank Cintel Limited, United Kingdom

[21] Appl. No.: 730,687

[22] Filed: Jul. 16, 1991

[30] Foreign Application Priority Data

Oct. 30, 1990 [GB] United Kingdom ............ 9023533.4

[51] Int. Cl.$^5$ .............................................. H02P 7/00
[52] U.S. Cl. ................... 318/268; 318/459; 318/2; 388/928.1
[58] Field of Search ............. 318/654, 671, 675, 690, 318/691, 692, 268, 248, 459, 1, 2, 9; 388/928.1

[56] References Cited
U.S. PATENT DOCUMENTS 4,078,194 3/1978 Johnson, Jr. .
4,144,481 3/1979 Clarke ............................ 318/457 X
4,202,549 5/1980 Takeuchi ........................ 318/640 X Primary Examiner—Bentsu Ro
Attorney, Agent, or Firm—Ostrolenk, Faber, Gerb & Soffen

[57] ABSTRACT

A control device for a film or tape transport comprises a control knob having a spindle which forms the rotor of an electric motor. The control knob is spun by the operator to generate a drive signal to advance or retard the film or tape driven by the transport system at a speed dependent on the speed of rotation. The rotational speed is sensed and a signal dependent thereupon is produced by a speed detector to control a servo-loop which drives the electric motor. The motor drives the control knob at substantially the same speed imparted by the operator without any further input by the operator. The control knob continues to be driven at this speed until the operator manually accelerates or decelerates the control knob.

8 Claims, 3 Drawing Sheets

CONTROL SYSTEM, ESPECIALLY FOR FILM AND VIDEO TAPE TRANSPORT

FIELD OF THE INVENTION

This invention relates to variable rate control systems, in particular, but not exclusively, to systems for controlling the transport of film or video tape.

BACKGROUND TO THE INVENTION

Existing video tape recorders (VTRs) include a speed adjuster in their transport control. This adjuster varies linearly the rate of movement of a video tape through the transport. The control is usually a rotary shaft with no end stops which can be continuously rotated in either direction. The control may be used in two modes as follows:

1. Shuttle

This operation is performed with or without recorded images on the tape being displayed and is a fast wind or rewind operation. On entry into the mode, the transport is stationary. Progressive angular movement of the rotary shaft increases the linear speed of the tape and maximum speed can be achieved with less than ±180° rotation. Rotation of the control back to its original position decreases the speed until it reaches its original position, whereupon the transport is stopped.

2. Job with Picture

In this mode, rotation of the shaft causes the tape to move forward linearly at a rate which is dependent upon the rate of shaft rotation. The shaft can be rotated slowly to up-date the video image frame by frame in a picture search operation or spun to advance or retard this tape at high speed. Forward and reverse movement of the tape is possible and the only limit on tape travel speed is the speed at which the operator can spin the shaft. The flywheel effect exhibited from system to system will vary depending upon the mass of the shaft and the friction in the system. However, to move the film a great distance the operator must continuously spin the shaft or revert to (1) shuttle operation. In this mode, the control system shaft can be regarded as an extension to the machine capstan motor.

The modes of operation described may also be applied to telecines and to other transport systems. Existing telecines incorporate a shuttle system similar to that described.

SUMMARY OF THE INVENTION

The present invention aims to provide an improved control for a transport system. It is applicable both to film and tape transfer and may also be used in conjunction with any other variable rate system. The invention has particular application to telecine and film writers but is in no way limited thereto.

In its broadest form, the invention detects rotation of a control member, for example the control knob, and continues to rotate the control member at this speed until a further input from the operator. More specifically, a motor is provided with a servo loop. The angular velocity of rotation of the control knob mounted on a control shaft is detected and a voltage signal is produced which is applied to the motor. This motor then generates a signal that is velocity dependant and this signal drives the transport capstan at a constant speed in accordance with the detected angular velocity.

In one preferred embodiment of the invention the back EMF from an electric motor produced on spinning the control knob is detected and used to produce a motor control signal. In another preferred embodiment a shaft encoder or similar device is used to detect the velocity of rotation of the control knob.

A system embodying the invention has the advantage that the two modes, shuttle and jog, may be combined into a single control. Moreover, the operator need only spin the control knob once unless it is desired to change the film or tape transport velocity.

The system has a characteristic similar to a flywheel with zero friction once set in motion.

Preferably, the speed detecting means ignores very low velocities so as to avoid creeping of the control. This is achieved by incorporation by a dead guard band.

A system embodying the invention has the further advantage that it can be used to play film or tape in slow motion either in forward or reverse mode.

BRIEF DESCRIPTION OF THE DRAWINGS

Embodiments of the invention will now be described, by way of example, and with reference to the accompanying drawings in which.

DESCRIPTION OF PREFERRED EMBODIMENTS

Figure 1:
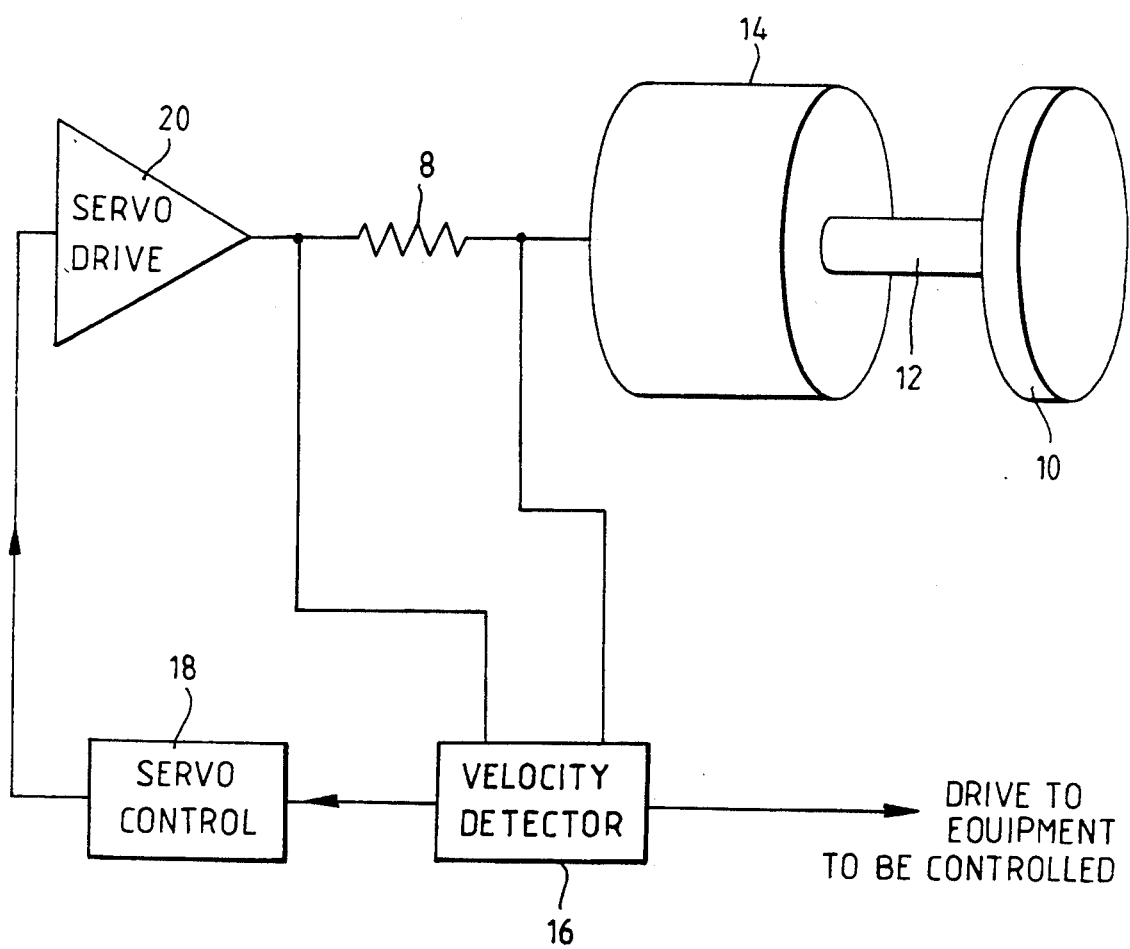
FIG. 1 is a schematic diagram of a first embodiment of the invention.

In the prior art jog control spinning the control knob effectively causes the capstan of the transport system to spin at a given speed and then to decrease in speed until it eventually returns to rest. In the arrangement illustrated in FIG. 1, spinning the control knob results in a velocity dependent signal being produced which causes an electric motor to be driven at a constant speed which in turn generates a drive signal to the equipment that causes the capstan of the transport system to be driven at a constant speed.

The control knob 10 has a spindle 12 attached to it which forms the rotor of an electric motor 14. Spinning the control knob causes the spindle to spin and causes the production of a back EMF across impedence 8 which is detected by velocity detector 16. This detector 16 forms a signal which is representative of the angular velocity of the control knob. In practice, the control knob velocity will vary as the operator spins it and, until the motor is energized, the velocity will decrease when the operator ceases manual operation. Once the velocity detector detects this deceleration, which will be reflected by a change in the back EMF, the velocity signal is formed. Thus, the signal will necessarily be slightly lower than the operators rotational velocity of the control knob.

The velocity signal is supplied to a servo control 18 which supplies an input to a servo drive 20. The servo drive forms an input to the motor 14 and ensures that the motor rotor 12 is driven at a constant speed. The constant drive to the motor will be applied to the velocity detector which will generate a drive signal to the transport system capstan at a constant speed.

The operator can change the speed and sense of rotation of the control motor by applying pressure to the control knob which is by now rotating at a constant speed. This pressure will be sensed by the velocity detector as a change in back EMF and a fresh velocity signal will be formed which will be relayed to the control servo drive and to the transport system capstan.

To avoid unwanted rotation at very low speeds a creep control is incorporated into the velocity detector. A dead guard band is provided so that very low velocities detected by the velocity detector are ignored.

It will be appreciated that the system described combines the function of the shuttle and jog mode of the prior art. The shuttle mode is achieved by varying the angular spinning velocity of the control knob at high speed. The frame by frame up-date achievable with jog mode can be attained with a very high degree of accuracy as slow rotation of the control allows the most subtle of film movements. Reverse film motion is also possible.

Figure 2:
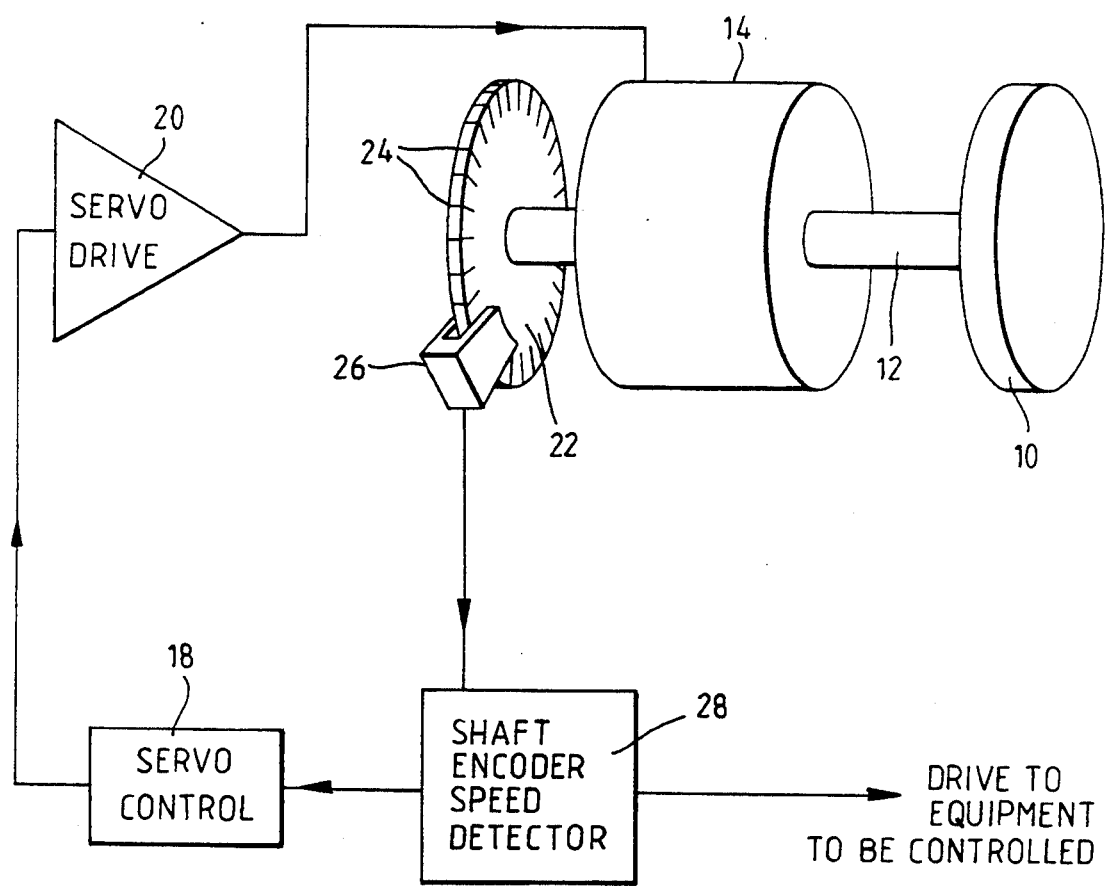
FIG. 2 is a schematic representation of a second embodiment of the invention.

In the system outlined in FIG. 2, an alternative velocity detector is provided in the form of a shaft encoder. These devices, which are well known, produce a digital velocity signal. In FIG. 2 a disk 22 is attached to the end of the control knob spindle 12. The disk has markings 24 around its periphery which are detected by a sensor 26. The shaft encoder speed detector 28 turns the rate of detection of the markings into a voltage signal which is applied to the servo control. The markings and the sensor may be one of a number of different known methods, for example LED's spaced arount the periphery of the disk 22 with a suitable sensor.

Figure 3:
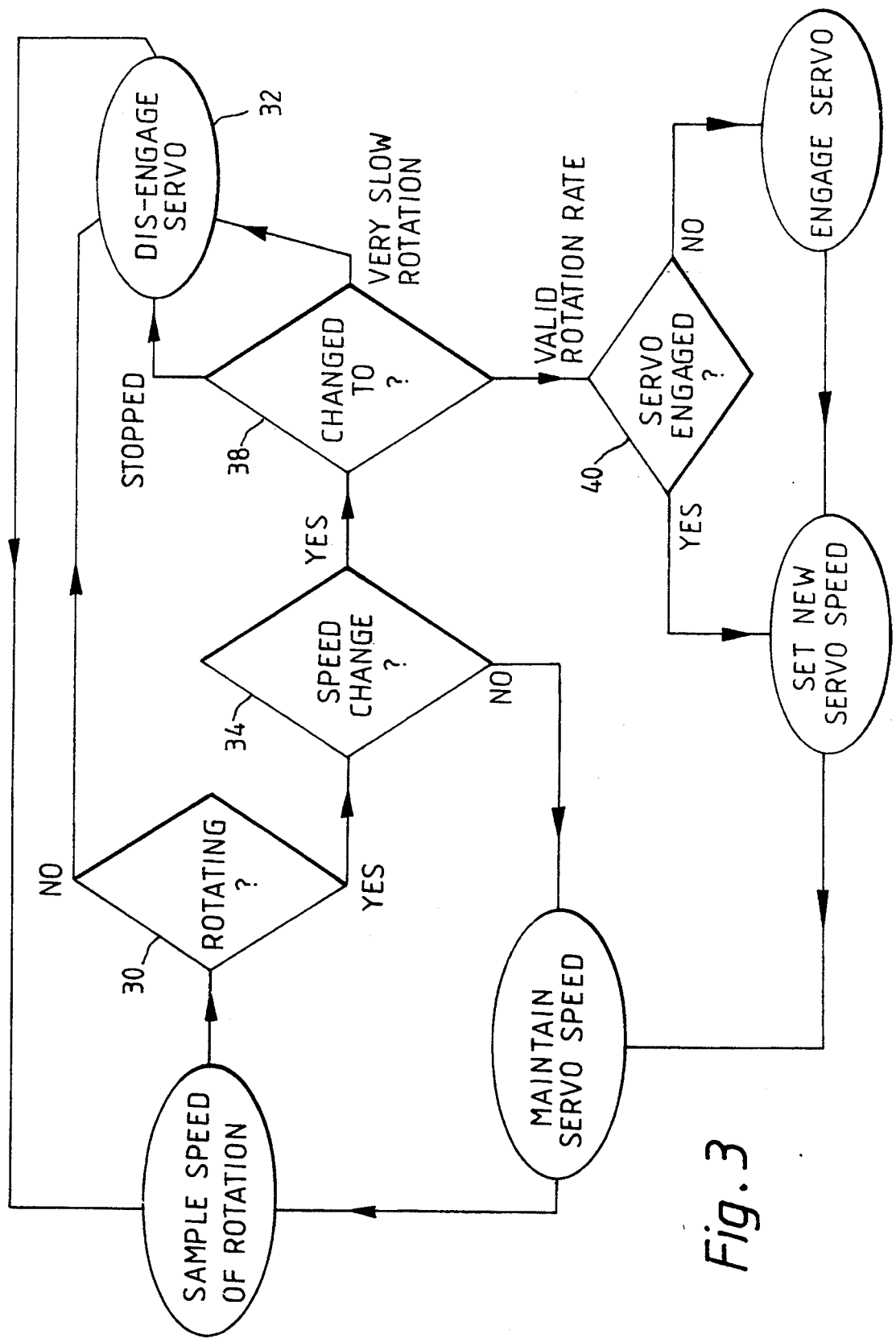
FIG. 3 is a flow diagram showing operation of the system.

Refering now to FIG. 3, the device operates, in either embodiment by means of microprocessor control or other intelligent electronics, as follows. At 30, a decision is taken as to whether or not the spindle is rotating. If it is not, the servo is disengaged at 32. If it is then the detector is interrogated as to whether there is a change of speed or sense of rotation at 34. If there is not, the servo speed in maintained. If the speed has changed then the speed detector is interrogated as to the new speed at 38. If the new speed is zero or a very slow speed then the servo is dis-engaged. The latter case being a speed within the dead guard band. At any other speed, the servo is interogated at 40 to determine whether or not it is engaged. If not it is then engaged and the new servo speed set according to the reading from the detector in response to step 38.

In this manner, the control motor reacts to change of speed caused by intervention of the operator by means of the control knob to ensure that the system is driven at the system required by the operator.

What is claimed is:

1. A control device for a system, comprising:
   rotatable control means for varying a parameter of said system to be controlled;
   sensing means for sensing a speed and sense of rotation of said rotatable control means imparted thereto by an operator; and
   motor means for driving said rotatable control means to maintain constant speed and sense, at substantially the sensed speed and sense, after setting by the operator.

2. The control device of claim 1, further comprising a servo-loop for operating said motor means to rotate the rotatable control means at the sensed speed;
   wherein said sensing means includes controlling means for controlling said servo-loop.

3. The control device of claim 2, wherein said controlling means for controlling said servo-loop includes means for energizing said servo-loop only when the sensed speed of said rotatable control means is greater than a predetermined value.

4. The control device of claim 1, wherein said rotatable control means has a spindle forming the rotor of said motor means, and said sensing means senses a back EMF produced by said motor means on rotation of said spindle.

5. The control device of claim 1, wherein said rotatable control means has a spindle forming the rotor of said motor means and said sensing means comprises a shaft encoder attached to said spindle.

6. The control device of claim 1, wherein the system controlled is a film or tape transport system and the capstan of the transport system is maintained by said motor means at a constant speed.

7. The control device of claim 1, wherein the device controls the rate of movement of film through a telecine.

8. The control device of claim 1, wherein the control device controls the rate of a continuously variable parameter of said system.

* * * * *